US012518653B2

(12) United States Patent
Kelly

(10) Patent No.: US 12,518,653 B2
(45) Date of Patent: Jan. 6, 2026

(54) REALTIME AI SIGN LANGUAGE RECOGNITION

(71) Applicant: Sign-Speak Inc., Victor, NY (US)

(72) Inventor: Nikolas Anthony Kelly, Victor, NY (US)

(73) Assignee: SIGN-SPEAK INC., Rochester, NY (US)

( * ) Notice: Subject to any disclaimer, the term of this patent is extended or adjusted under 35 U.S.C. 154(b) by 622 days.

(21) Appl. No.: 17/302,699

(22) Filed: May 11, 2021

(65) Prior Publication Data

US 2022/0327961 A1   Oct. 13, 2022

Related U.S. Application Data

(60) Provisional application No. 63/101,716, filed on May 11, 2020.

(51) Int. Cl.
| G09B 21/04 | (2006.01) |
| G06F 40/58 | (2020.01) |
| G06V 40/20 | (2022.01) |

(52) U.S. Cl.
CPC ............. *G09B 21/04* (2013.01); *G06F 40/58* (2020.01); *G06V 40/28* (2022.01)

(58) Field of Classification Search
CPC .......... G09B 21/04; G06F 40/58; G06V 40/28
See application file for complete search history.

(56) References Cited

U.S. PATENT DOCUMENTS

| 5,473,705 | A | 12/1995 | Abe |
| 5,659,764 | A | 8/1997 | Sakiyama |
| 7,746,986 | B2 | 6/2010 | Bucchieri |
| 8,428,643 | B2 | 4/2013 | Lin |
| 8,890,813 | B2 | 11/2014 | Minnen |
| 9,098,493 | B2 | 8/2015 | Tardif |
| 9,734,730 | B2 * | 8/2017 | Divakaran ............. G09B 19/00 |
| 10,192,105 | B1 | 1/2019 | Mahmoud |
| 10,261,596 | B2 | 4/2019 | Burr |
| 10,262,198 | B2 | 4/2019 | Mahmoud |
| 10,268,879 | B2 | 4/2019 | Mahmoud |
| 10,289,903 | B1 | 5/2019 | Chandler |
| 10,304,208 | B1 | 5/2019 | Chandler |
| 10,521,264 | B2 | 12/2019 | Chandler |
| 10,762,340 | B2 | 9/2020 | Kaur |
| 10,885,318 | B2 | 1/2021 | Maxwell |
| 10,977,452 | B2 * | 4/2021 | Wang ...................... G06F 40/58 |
| 10,991,380 | B2 | 4/2021 | Santos |
| 11,163,373 | B2 * | 11/2021 | Liu ........................ G06V 40/28 |
| 11,323,663 | B1 | 5/2022 | Kasaba |

(Continued)

OTHER PUBLICATIONS

Habibie, I., et al., "Learning Speech-driven 3D Conversational Gestures from Video," arXiv, Computer Vision and Pattern Recognition, (Feb. 2021), 15 Pages.

(Continued)

*Primary Examiner* — Eddy Saint-Vil
(74) *Attorney, Agent, or Firm* — Sterne, Kessler, Goldstein & Fox P.L.L.C.

(57) ABSTRACT

A real time sign language recognition method that allows Deaf and Hard of Hearing individuals to sign into any apparatus with a camera to extract target information (such as a translation in a target language) is proposed.

20 Claims, 4 Drawing Sheets

Conference Call Embodiment

(56) References Cited

U.S. PATENT DOCUMENTS

| 11,741,755 B2* | 8/2023 | Ko | G06V 40/28 |
|---|---|---|---|
| | | | 382/100 |
| 2006/0174315 A1 | 8/2006 | Kim et al. | |
| 2016/0307469 A1 | 10/2016 | Zhou | |
| 2017/0351910 A1 | 12/2017 | Elwazer | |
| 2019/0050637 A1* | 2/2019 | Mahmoud | G06V 40/28 |
| 2019/0171716 A1 | 6/2019 | Weber | |
| 2022/0327961 A1 | 10/2022 | Kelly | |

OTHER PUBLICATIONS

International Search Report and Written Opinion for Application No. PCT/US2024/036228, mailed on Dec. 2, 2024, 5 pages.

Kotha, H., et al., Audio to Sign language Using NLTK, International Journal of Emerging Technologies and Innovative Research 10(6):e404-e408, (Jun. 2023). (retrieved on Sep. 4, 2024). URL: [https://www.jetir.org/view?paper=JETIR3206484].

Sharma, P., et al., "Translating Speech to Indian Sign Language Using Natural Language Processing," Future Internet 14(9):253, (Aug. 2022), 17 Pages.

* cited by examiner

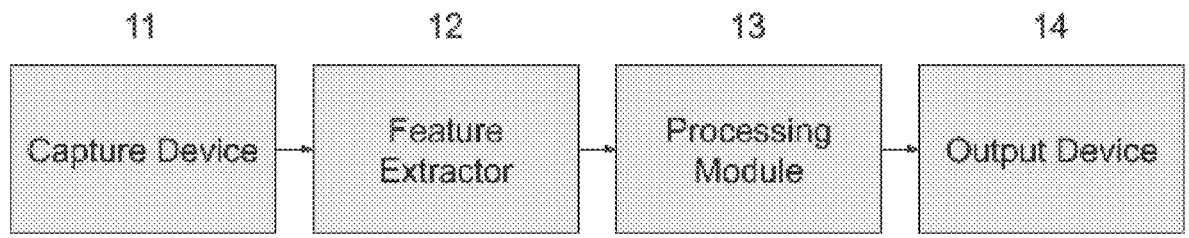
Figure 1: Generalized architecture block diagram
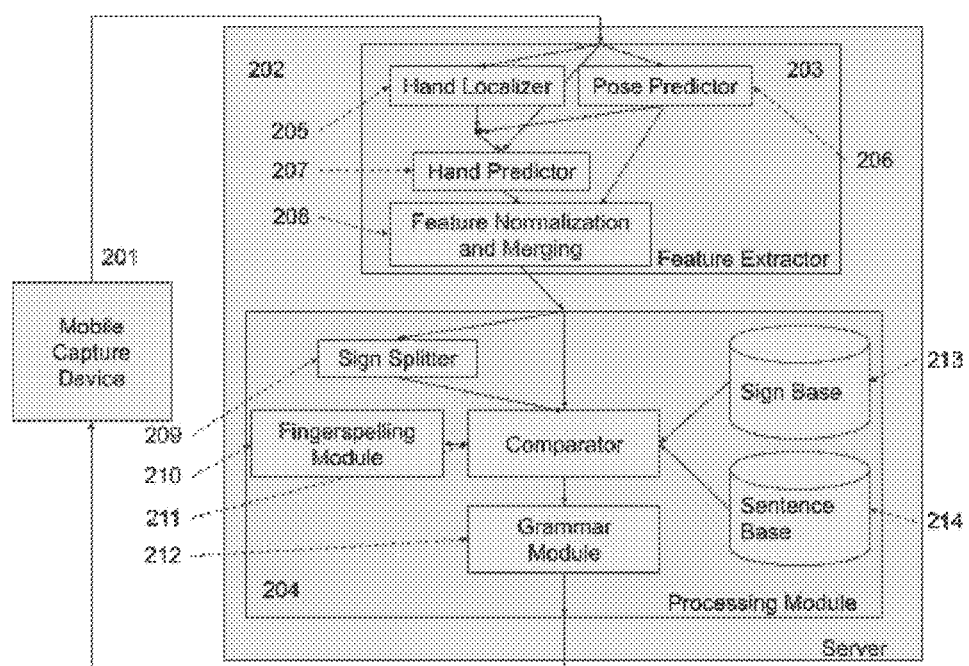
Figure 2: Translation architecture block diagram

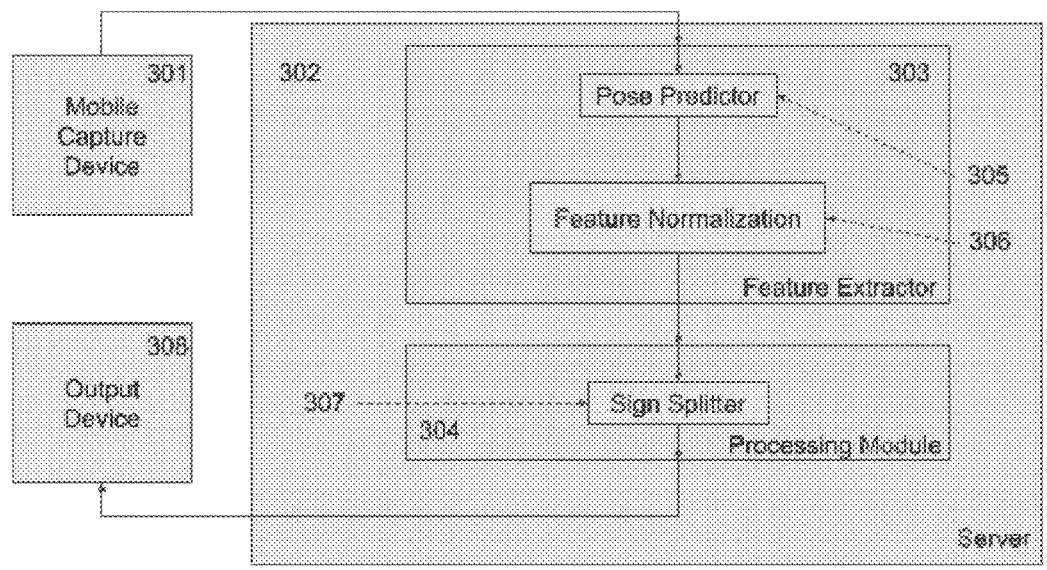
Figure 3: Sign detection architecture block diagram
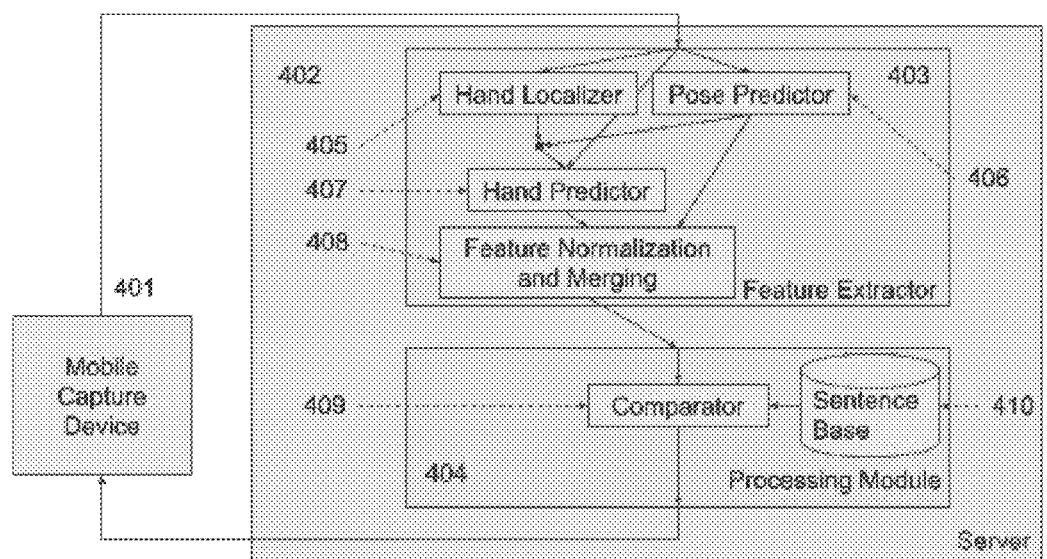
Figure 4: ASL Menu architecture block diagram

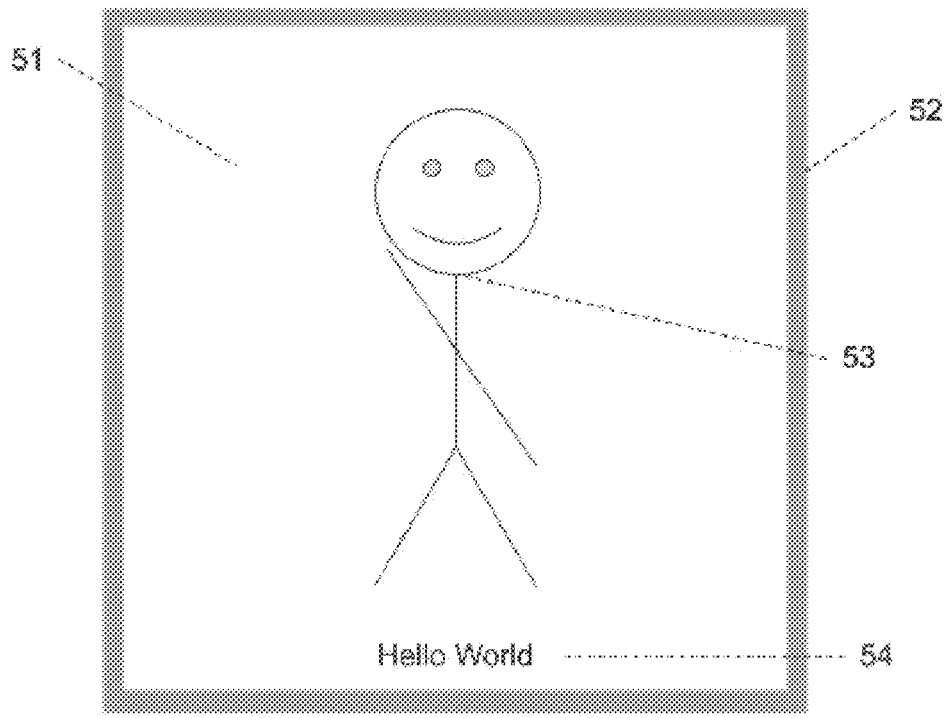
Figure 5: Real Time Interpreter Embodiment
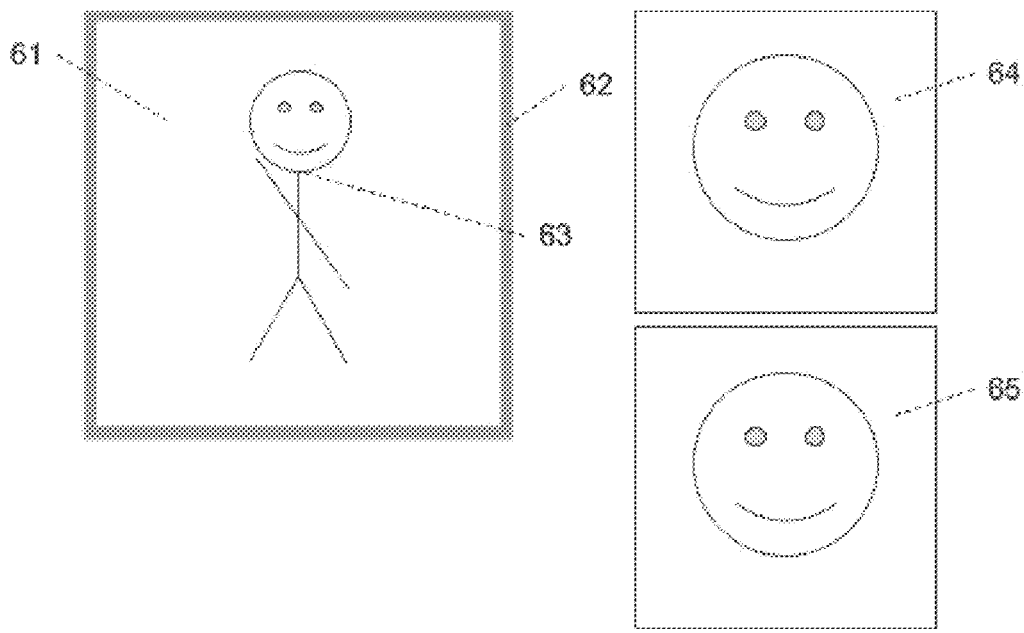
Figure 6: Conference Call Embodiment

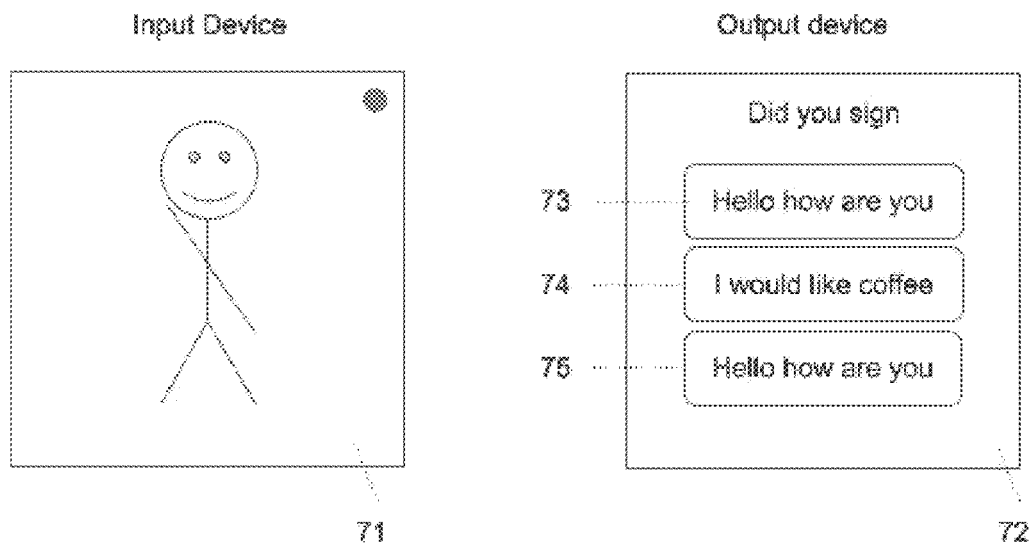
Figure 7: ASL Menu Embodiment
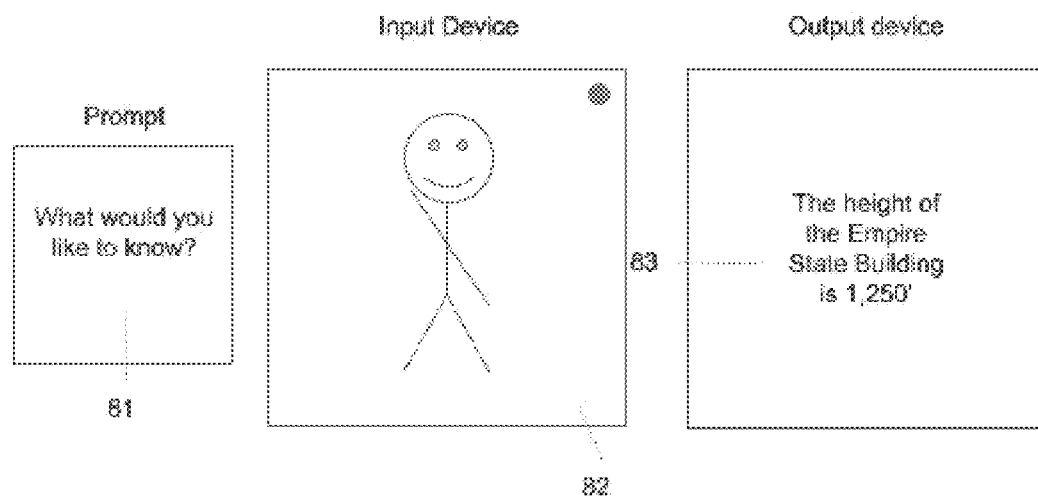
Figure 8: Question Answering System Embodiment

REALTIME AI SIGN LANGUAGE RECOGNITION

BACKGROUND

Technical Field

Embodiments of the present disclosure relate to artificial intelligence (AI), machine learning (ML) and more particularly machine translation and processing of signed languages as an assistive technology for Deaf and Hard of Hearing (D/HH) Individuals.

Description of Prior Art

Currently, Signers (e.g. Deaf and Hard of Hearing individuals) experience many hurdles when communicating with nonsigning individuals. In impromptu settings, interpreters cannot be feasibly provided immediately. Such limitations often necessitate using some other mode of communication, such as writing back and forth or lip reading, resulting in dissatisfactory experiences.

From a user's perspective, the relevant prior art is suboptimal, whether clumsy or expensive. These can be stilted, requiring confirmation of each interaction or initial calibration, dependent on costly external hardware, such as gloves, sophisticated 3D cameras, or sophisticated camera arrays, or necessitate substantial computational capabilities as all of the image processing has to be done locally. In contrast, as disclosed in this application, our technology has significantly increased accuracy when compared to these prior arts, requiring only a device with internet connection and a single lens camera. However, our technology is further capable of scaling to additional cameras and lenses for improved accuracy. Our technology is capable of real time captioning, producing translations as the user is signing. Additionally, our technology requires no initial setup, calibration, or customization. From a technical perspective, prior arts often use sub-par intermediary features (such as blob features or SIFT features). Our technology uses extracted body pose and hand pose information directly. Moreover, prior art performs all computation on-device which would be limiting for computationally complex operations. Our technology mitigates this by performing computationally intensive operations on an external server enabling more complex models to be used. Finally, it is important to distinguish between gesture recognition and sign language processing. As sign languages have their own grammar, processing them becomes exponentially more challenging. Our technology is not grammar agnostic but rather grammar aware and therefore is not merely recognizing gestures, but the full spectrum of sign language.

This Sign Language Translation method provides an automated interpreting solution which can be used on any device at any time of day. It provides a real time translation between nonsigners and signers so information can be effectively communicated between the two groups. This system can operate on any platform enabled with video capturing (e.g. tablets, smartphones, or computers), allowing for seamless communication.

Furthermore, this disclosure can be easily modified for more elaborate or general systems (such as signing detection or information retrieval).

BRIEF DESCRIPTION OF THE DRAWINGS

FIG. 1 is a block diagram for the generalized architecture of the disclosure capable of processing sign language to some target output.

FIG. 2 is a block diagram of our embodiment for Sign Language Translation, which takes as input a video stream and outputs (either simultaneously while receiving the videostream, or after the videostream input has finished) a translation of what was signed into a target language.

FIG. 3 is a block diagram of our embodiment for Sign Language Detection, in which the user is captured via an input device, and is
  Brought into focus when they are signing
  Brought out of focus when they are not signing FIG. 4 is a block diagram of our embodiment for Sign Language Information Retrieval, which takes as input a video stream and outputs the most likely sentence selected from a sentence bank after the user is finished signing (this is called an ASL menu).

FIG. 5 presents a User Interface schematic for a real time interpretation. This real time interpreter not only translates from a sign language to a target language, but also detects when the user is signing.

FIG. 6 presents a User Interface schematic for a conference call with a D/HH user where the user that is signing is focused.

FIG. 7 presents a User Interface schematic for a sign language translation device in which the user signs into the device and the most likely sentences are selected from a sentence bank and presented to the user for confirmation.

FIG. 8 presents a User Interface schematic for a sign language translation device in which the user signs into the device and the most likely sentences are selected from a sentence bank and presented to the user for confirmation

DETAILED DESCRIPTION

Generalized Architecture

The generalized architecture is depicted in FIG. 1 with example embodiments depicted in FIGS. 2-4.

Note that our embodiments do not require any specialized hardware besides a camera and wifi connection (and therefore would be suitable to run on any smartphone or camera-enabled device). Note further that our embodiments do not require personalization on a per-user basis, but rather functions for all users of a particular dialect of sign language. Finally, note that our embodiments are live, producing a real time output.

Our generalized architecture is as follows. A signer signs into 11 an input device (e.g. minimally a single lens camera). In real time, or after the signing is completed, the sign language information is sent to 12, which extracts out features (e.g. body pose keypoints, hand keypoints, hand pose, thresholded image, etc. . . . ). The features produced by 12 are then transmitted to component 13 which extracts sign language information (e.g. detecting if an individual is signing, transcribing that signing into gloss, or translating that signing into a target language) from a sequence of these per-frame features. Finally, the output is displayed on 14.

In our generalized architecture, at least 12 or 13 must reside (at least in part) on a cloud computation device. This allows for real time feedback to the user during signing enabling more natural interactions.

Real Time Interpreter Embodiment

An example embodiment of this is presented in FIG. 5. A signing user 53 is displayed on the output device 51. Via the presented system, it is automatically determined if the user is signing. When the user is signing, they are brought to focus via 52, a border around their video stream. Simultaneously, a live captioning is produced within a target language (e.g. English) and displayed on 54.

Our method for producing this translation is contained within FIG. 2. An image train is captured on 201 and streamed, either real time or after capturing is finished. Specifically, within our embodiment of 12, our system performs pose detection via Convolutional Pose Machines in 206 and hand localization via a RCNN in 205. These results are combined to find the bounding box of both the dominant and non-dominant hand by iterating through all bounding boxes found from 205 and finding the one closest to each wrist joint produced by 206. A CPM extracts the hands' poses from the dominant and non-dominant hands' bounding boxes in 207. Finally, all this information is merged into a flattened feature vector. These feature vectors are then normalized in 208 by Setting the Head coordinates to be (0,0) in the pose and both shoulders to be an average of one unit away via an affine transform.

Setting the mean coordinates of each hand to be (0, 0, 0) and the standard deviation in each dimension for the coordinates of each hand to be an average of 1 unit via an affine transformation.

The feature vectors for a certain time period are collected and smoothed using exponential smoothing into a feature vector. The smoothed and normalized feature vectors are then sent to the processing module in 204.

Note that in the real time translation variant, for each new frame received, that frame is appended to the feature queue, and the resultant feature queue is smoothed and sent to the processing module 204 to be reprocessed.

In the processing module 202, the feature train is split into each individual sign via the sign-splitting component 209 via a 1D Convolutional Neural Network which highlights the sign transition periods. Note that this CNN additionally locates non-signing regions by outputting a special flag value (i.e. 0=intrasign region, 1=intersign region, 2=non-signing region). The comparator in 211 then first determines if the entire signing region of the feature vector is contained within the list of pre-recorded sentences in the sentence base 214 (a database of sentences) via K Nearest-Neighbors (KNN) with a Dynamic Time Warping (DTVV) distance metric. If the feature vector does not correspond to a sentence, the comparator 211 then goes through each signs' corresponding region in the feature queue and determines if that sign was fingerspelled (done through a binary classifier) . If so, the sign is processed by the fingerspelling module in 210 (done through a seq2seq RNN model). If not, the sign is determined by comparing with signs in the signbase in 213 (a database of individual signs) and choosing the most likely candidate (done through KNN with a distance metric of DTVV). Finally, a string of sign language gloss is output (the signs which constituted the feature queue). As the sign transcribed output is not yet in English, the grammar module in 213 translates the gloss to English via a Seq2Seq RNN. The resulting english text is returned to the device for visual display 201.

Signing Detection Embodiment

An example embodiment for signing detection of this is presented in FIG. 6. Specifically, in this scenario, N users connect to a video call with K (where K<N) of them are signers 63 and N-K of them are non signers 64, 65. When a given user is either speaking (detected via a threshold in noise) or signing (detected via this embodiment), they are brought to focus (i.e. spotlighted) via a border around their image 62.

Our method for performing signing detection utilizes a subset of the components of the real time interpreter embodiment and is illustrated in FIG. 3. Specifically, an image train is captured on all signer's devices 301 and streamed, either real time or after capturing is finished to 303. Within this embodiment of 12, our system only performs pose detection via Convolutional Pose Machines in 305 to form a feature vector. This feature vector is then normalized in 306 by Setting the Head coordinates to be (0,0) in the pose and both shoulders to be an average of one unit away via an affine transform.

The feature vectors for a certain time period are collected and smoothed into a feature vector using exponential smoothing. The smoothed and normalized feature vectors are then sent to the processing module in 304. Additionally, for each new frame received, that frame is appended to the feature queue, and the resultant feature queue is smoothed and sent to the processing module 304 to be reprocessed.

In the processing module, the feature train is split into each individual sign via the sign-splitting component 307 via a 1D Convolutional Neural Network which highlights the sign transition periods. Note that this CNN additionally locates non-signing regions by outputting a special flag value (i.e. 0=intrasign region, 1=intersign region, 2=non-signing region). Finally, this system collects all users whose signing detection is currently either 0 or 1 (i.e. is signing). This is sent to all other conference call participants 308 so that the specified individuals can be spotlit.

Few Option Sign Language Translation Embodiment

It is desirable to limit the possible choices of the signed output to improve accuracy. An example embodiment of few-option sign language translation is shown in FIG. 7. A user signs into a capture device equipped with several single lens cameras 71. After the user finishes signing, the method processes the input and finds the three most likely translations. These options are then presented to the user in a menu 72 for them to choose from (73, 74, 75).

The architecture for achieving this is included in FIG. 4. As in the last embodiment, the components used in this embodiment are a strict subset of real time interpreter embodiment. Specifically, an image train is captured on a specialized device with several single camera lens setup 301 and streamed, either real time or after capturing is finished. Each frame goes through the feature extractor 403 which is equivalent to 203 in the unconstrained interpretation embodiment. Then, in the processing module 404, the comparator 409 (equivalent to 211) determines if the feature vector is contained within the list of pre-recorded sentences in the sentence base 410 (a database of sentences) via K Nearest-Neighbors (KNN) with a Dynamic Time Warping (DTW) distance metric. If the feature queue is found, the top three options are sent to the end user for presentation in 72.

Question Answering System Embodiment

In the question answering system embodiment, a user is prompted to sign a question to the system in 81. They then sign into the capture system in 82. The sign language is translated into gloss or english via the Real Time Interpreter embodiment presented in the disclosure above. Finally, the output is sent through an off the shelf question answering system to produce the output 83.

I claim:

1. A method, comprising:
    capturing a sequence of images;
    for an image within the sequence of images, detecting pose information by:
        applying a first pose network to detect a body pose configuration in the image;
        applying a second pose network to detect a hand pose configuration in the image;

generating a feature vector including the body pose configuration and the hand pose configuration; and converting the feature vector into a flattened feature vector having a predefined size;

generating a feature queue by collecting the flattened feature vector for the image of the sequence of images; and converting the feature queue into a target language output.

2. The method of claim 1, wherein converting the feature queue comprises:

splitting the feature queue into individual regions; and processing the individual regions into a sign language string.

3. The method of claim 2, wherein processing the individual regions comprises determining whether the individual regions are one of a pre-recorded sentence or an individual sign in one or more databases.

4. The method of claim 2, wherein processing the individual regions comprises applying a binary classifier to determine whether one or more of the individual regions is fingerspelled.

5. The method of claim 2, wherein processing the individual regions comprises:

comparing the individual regions to signs in one or more databases to generate comparison results; and choosing a sign based on a K Nearest Neighbor function or a Dynamic Time Warping function applied to the comparison results.

6. The method of claim 1, wherein converting the feature queue comprises applying a Convolutional Neural Network (CNN) configured to output one or more flag values associated with an intrasign region, an intersign region, or a non-signing region, and wherein the one or more flag values correspond to an individual sign.

7. A method, comprising:

detecting hand pose information from a sequence of image frames;

converting the hand pose information into a flattened feature vector;

normalizing the flattened feature vector into a resultant feature vector;

applying a convolutional neural network (CNN) to split the resultant feature vector into a plurality of individual regions by highlighting sign transition periods;

applying the CNN to output a respective flag corresponding to each individual region of the plurality of individual regions, wherein the respective flag indicates whether the corresponding individual region is an intrasign region, intersign region, or a nonsigning region, and wherein the intrasign and intersign regions correspond to signing regions of the plurality of individual regions;

processing the signing regions of the plurality of individual regions into a sign language string based on language information in one or more databases; and translating the sign language string into a target language output.

8. The method of claim 7, wherein normalizing the flattened feature vector comprises:

setting head coordinates to be (0,0) in a pose and shoulders to be an average of 1 unit via a first affine transform; and setting mean coordinates of one or more hands to be (0,0,0), wherein a standard deviation in the mean coordinates is an average of 1 unit via a second affine transform.

9. The method of claim 7, wherein processing the signing regions comprises determining whether the signing regions are one of a pre-recorded sentence or an individual sign in the one or more databases by applying a K Nearest Neighbor function or a Dynamic Time Warping function on the individual regions.

10. The method of claim 7, wherein processing the signing regions comprises applying a binary classifier to determine whether one or more of the signing regions is fingerspelled.

11. The method of claim 7, wherein processing the signing regions comprises:

comparing one or more of the signing regions to signs in the one or more databases to generate comparison results; and choosing a sign based on a K Nearest Neighbor function or a Dynamic Time Warping function applied to the comparison results.

12. The method of claim 7, further comprising outputting a plurality of selectable translations associated with the target language output.

13. The method of claim 7, wherein normalizing the flattened feature vector comprises setting coordinates corresponding to a user head to be at an origin and coordinates corresponding to user shoulders to be at a unit distance from the origin.

14. A device, comprising:

a camera configured to capture a sequence of image frames;

a computing device coupled to the camera, the computing device comprising:

a processor; and a memory, wherein the memory contains instructions stored thereon that when executed by the processor cause the processor to:

detect hand pose information from the sequence of image frames;

convert the hand pose information into a flattened feature vector;

normalize the flattened feature vector into a resultant feature vector;

apply a convolutional neural network (CNN) to split the resultant feature vector into a plurality of individual regions by highlighting sign transition periods;

apply the CNN to output a respective flag corresponding to each individual region of the plurality of individual regions, wherein the respective flag indicates whether the corresponding individual region is an intrasign region, intersign region, or a nonsigning region, and wherein the intrasign and intersign regions correspond to signing regions of the plurality of individual regions;

process the signing regions of the plurality of individual regions into a sign language string based on language information in one or more databases; and translate the sign language string into a target language output.

15. The device of claim 14, wherein to process the signing regions, the processor is configured to determine whether the signing regions are one of a pre-recorded sentence or an individual sign in the one or more databases by applying a K Nearest Neighbor function or a Dynamic Time Warping function on the individual regions.

16. The device of claim 14, wherein to process the signing regions, the processor is configured to apply a binary classifier to determine whether one or more of the signing regions is fingerspelled.

17. The device of claim 14, wherein to process the signing regions, the processor is configured to:
   compare the signing regions to signs in the one or more databases to generate comparison results; and
   choose a sign based on a K Nearest Neighbor function or a Dynamic Time Warping function applied to the comparison results.

18. The device of claim 14, wherein the processor is further configured to output a plurality of selectable translations associated with the target language output.

19. The device of claim 14, wherein the processor is further configured to use an affine transformation to normalize the flattened feature vector.

20. The device of claim 14, wherein to normalize the flattened feature vector, the processor is configured to set coordinates corresponding to a user head to be at an origin and coordinates corresponding to user shoulders to be at a unit distance from the origin.

\* \* \* \* \*